U.S. Patent No.: US 6,578,415 B2
Date of Patent: Jun. 17, 2003

(12) United States Patent
Schimmel et al.

(54) LIMIT-LEVEL SENSOR AND METHOD OF DETERMINING THE UNDERSHOOTING OR OVERSHOOTING OF AN INTENDED LEVEL OF LIQUID IN A CONTAINER

(75) Inventors: Ralf Schimmel, Weilmünster (DE); Stefan Lipfert, Kelkheim (DE); Joachim Acht, Frankfurt (DE); Werner Wallrafen, Hofheim (DE)

(73) Assignee: Mannesman VDO AG, Frankfurt (DE)

( * ) Notice: Subject to any disclaimer, the term of this patent is extended or adjusted under 35 U.S.C. 154(b) by 20 days.

(21) Appl. No.: 09/835,165

(22) Filed: Apr. 13, 2001

(65) Prior Publication Data

US 2001/0015100 A1 Aug. 23, 2001

Related U.S. Application Data

(62) Division of application No. 08/988,860, filed on Dec. 11, 1997, now Pat. No. 6,237,411.

(30) Foreign Application Priority Data

Dec. 21, 1996 (DE) .......................................... 196 53 879

(51) Int. Cl.⁷ ................................................ G01F 23/00
(52) U.S. Cl. .......................... 73/295; 73/290 R; 73/294; 340/622; 340/450.3; 340/450.2
(58) Field of Search ............................. 73/295, 290 R, 73/304 R, 294; 340/450.2, 450.3

(56) References Cited

U.S. PATENT DOCUMENTS

| 3,833,874 A | * | 9/1974 | Marcoux | 337/100 |
| 4,564,834 A | | 1/1986 | Steele | 340/622 |
| 4,638,288 A | | 1/1987 | Remec | 340/622 |
| 5,197,329 A | | 3/1993 | Grundy | 73/295 |
| 5,589,823 A | * | 12/1996 | Lange | 340/622 |

FOREIGN PATENT DOCUMENTS

| EP | 0405414 | 1/1991 |
| EP | 0552913 | 7/1993 |

* cited by examiner

*Primary Examiner*—Helen Kwok
*Assistant Examiner*—Rodney T. Frank
(74) *Attorney, Agent, or Firm*—Martin A. Farber

(57) ABSTRACT

A limit-level sensor for measuring level of a liquid has a resistance element which has an electric resistance which suddenly varies a transition temperature which lies above the maximum liquid temperature. The resistance element is first of all heated by electric current. Thereupon, the electric resistance of the resistance element is measured. When the resistance element is covered with liquid, the heat generated by the electric current is led away so that the temperature of the resistance element is less than its transition temperature. If the resistance element is not covered by liquid, this heat is scarcely led away, so that the temperature of the resistance element remains above the transition temperature.

13 Claims, 2 Drawing Sheets

LIMIT-LEVEL SENSOR AND METHOD OF DETERMINING THE UNDERSHOOTING OR OVERSHOOTING OF AN INTENDED LEVEL OF LIQUID IN A CONTAINER

RELATED APPLICATION

THIS IS A CONTINUING DIVISIONAL APPLICATION OF OUR COPENDING application Ser. No. 08/988,860 FILED Dec. 11, 1997, now U.S. Pat. No. 6,237,411 UNDER 35 U.S.C. 120, the entire contents of which are incorporated by reference herein.

FIELD AND BACKGROUND OF THE INVENTION

The present invention relates to a level sensor which is developed so as to determine the undershooting or overshooting of a predetermined level of liquid in a container, the sensor having a resistance element which is traversed by electric current and changes its electrical resistance upon an increase in the temperature, and having a measuring unit for measuring the electric resistance of the electrical conductor. The invention also relates to a method of determining the undershooting or overshooting of an intended level of liquid in a container, in which method a resistance element which is arranged at the intended level of filling and changes its electrical resistance with an increase in temperature is heated by an electric current whereupon its electrical resistance is measured.

Such limit-level sensors are frequently used in motor vehicles, for instance in a transmission, an internal combustion engine or a fuel tank and are known from actual practice. As resistance element, the limit-level sensor has a resistance wire which extends down into the region of the bottom of a container to be measured. For the measurement, the resistance wire is traversed by an electric current. In this way, the resistance wire is heated, thereby changing its electrical resistance. Since the heat produced thereby in the region of the resistance wire immersed in the liquid is substantially more strongly led away from the liquid than the region above the liquid, the level of the liquid can be calculated from the resistance ascertained and compared with a minimum level.

This method has the disadvantage that the resistance of the resistance wire which is determined is influenced by the temperature of the liquid. The determination of the level is thus relatively inaccurate. Therefore, a measurement of the minimum level of motor oil in an internal combustion engine of a motor vehicle having this level sensor is possible only at great expense.

For the dependable determination of the level of a liquid having a particularly high temperature, floats provided with a magnet which float on the liquid are known. When an intended level is undershot or overshot, the magnet switches a reed contact which is arranged at the height corresponding to the level. Such a limit-level switch, however, is particularly expensive. Furthermore, this level switch has movable parts which can jam.

SUMMARY OF THE INVENTION

The object of the present invention is to develop a limit-level sensor of the aforementioned type in such a manner that it has no movable parts and that the overshooting or undershooting of a level of a liquid can be reliably determined with it even at high temperatures. Furthermore, a method is to be provided for determining the undershooting or overshooting of an intended height of filling of liquid in a container.

The first-mentioned problem is solved in accordance with the invention in the manner that the resistance element is arranged exclusively at the intended height of filling and has an electrical resistance which changes suddenly above a transition temperature which lies above the maximum temperature of the liquid.

DETAILED DESCRIPTION OF THE PREFERRED EMBODIMENT

The resistance element is first of all heated electrically like the resistance wire of the known level-limit sensor. If the heat produced thereby is removed very rapidly, the resistance element is sufficiently covered by liquid. Since air removes the heat very poorly from the resistance element, the resistance element will heat up to a temperature above the transition temperature (for instance a PTC element) in case of too low a level of filling and initially retain this temperature. In this way, a resistance value which has been determined can be ascribed unequivocally to a temperature range of the resistance element which lies above or below the transition temperature and an overshooting or undershooting of the level of the liquid can thus be determined. Since the temperature of the liquid lies below the transition temperature of the resistance element, its influence on the result of the measurement is negligible.

In accordance with an advantageous further development of the invention, the limit-level sensor is suitable for use at particularly high temperatures, if the resistance element is a PTC element. Such a PTC element has a particularly high transition temperature of about 250° C. Up to the transition temperature, the electrical resistance of the PTC element decreases slightly with an increase in temperature. Above the transition temperature, the electrical resistance increases abruptly.

The electrical resistance of the resistance element can be determined in a particularly simple manner, in accordance with an advantageous further development of the invention, if the resistance element is connected in series with a series resistor. In this way, the voltage is measured on the resistance element. With the total voltage on the series resistor and the resistance element known, the voltage measured is dependent directly on the electrical resistance of the resistor element.

The mounting of the resistance element is particularly simple in accordance with another advantageous development of the invention if the limit-level sensor has a housing which can be assembled from two housing parts and if connecting wires leading to the resistance element are clamped between the two housing parts.

A discharge of the heat produced by the heating of the resistance element is reliably prevented, in accordance with another advantageous development of the invention, if the resistance element is soldered or welded to the connecting wires, and if the housing has exclusively points of contact with the connecting wires. Furthermore, this development has the advantage that liquid or can flow freely around the resistance element.

In accordance with another advantageous feature of the invention, the housing can be produced particularly inexpensively if one of the housing parts has a plurality of thin-wall transverse ribs which have grooves to receive the connecting wires and if the second housing parts has projections which lie on the connecting wires. Furthermore, by this development, the removal of heat via the connecting wires and the housing is kept particularly slight.

Particularly at low temperatures and with too low a level, a drop of liquid adhering between the resistance element and the housing can lead the heat away from the resistance element and result in an erroneous measurement. Such an erroneous measurement can be dependably avoided in accordance with another advantageous feature of the invention if there is a distance between the resistance element and the regions of the housing which are adjacent it.

The resistance element which is held exclusively by the connecting wires requires particularly strong connecting wires for an oscillation-resistant attachment. A discharge of the heat of the resistance element over the connecting wires is kept particularly slight in accordance with another advantageous development of the invention if the connecting wires are made, for instance, of constantan.

A minimum level and a maximum level can be easily determined by another advantageous development of the invention if the limit-level sensor has two resistance elements arranged at different heights.

The second problem, namely the creation of a method for the determining an undershooting or overshooting of an intended level of liquid in a container is solved, in accordance with the invention, in the manner that upon the heating, the resistance element is fed as much electrical energy as is necessary in order to exceed a transition temperature of the resistance element present in air which abruptly changes the electrical resistance.

By this method, a value which can be unambiguously associated with the region above or below the transition temperature, is obtained upon the measurement of the electrical resistance of the resistance element. If the resistance element extends into the liquid, then the heat produced by the electric current is led away by the liquid and the resistance element has a temperature, and thus a corresponding value of resistance, below the transition temperature. In the event that the resistance element does not extend into the liquid, the heat is not led away, so that the temperature of the resistance element remains above the transition temperature. A further advantage of this method is that liquid which adheres to the resistance element is first of all also heated. This leads, for instance in the event of cold oil, to a reduction in its viscosity and thus to a dripping of oil from the resistance element. In this way, erroneous measurements are reliably prevented.

The method of measurement requires particularly little time in accordance with an advantageous further development of the invention if the resistance element is heated with a electric current via a series resistance and the voltage then measured on the resistance element. The voltage measured on the resistance element is dependent on the electrical resistance of the resistance element.

A limit-level sensor used for the determination of a minimum level of motor oil in an internal combustion engine of a motor vehicle is particularly reliable if the heating of the resistance element is commenced about five to ten minutes after the disconnecting of the internal combustion engine.

BRIEF DESCRIPTION OF THE DRAWINGS

With the above and other objects and advantages in view, the present invention will become more clearly understood in connection with the detailed description of preferred embodiments, when considered with the accompanying drawings, of which.

DETAILED DESCRIPTION OF THE PREFERRED EMBODIMENT

Figure 1:
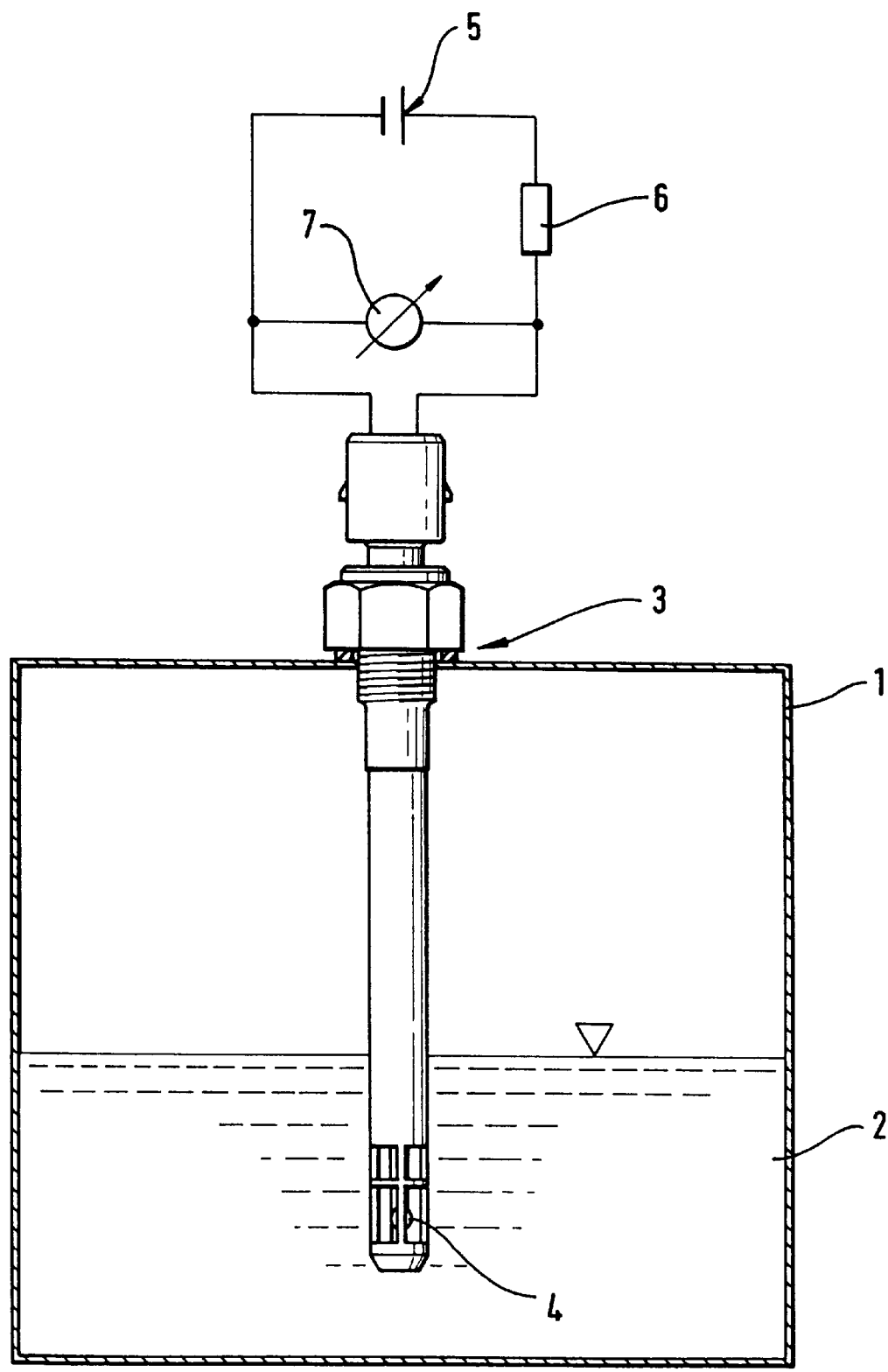
FIG. 1 shows a limit-level sensor in accordance with the invention, with a diagrammatic showing of an electric circuit.

FIG. 1 shows a limit-level sensor 3 in a container 1 containing liquid 2. The limit-level sensor 3 is provided on its lower end with a resistance element 4 which dips into the liquid 2 and is fed via a series resistor 6 with electric current from a source of voltage 5 arranged outside the container 1. The resistance element 4 can, for instance, be a PTC element, in which the electric resistance decreases slightly with an increase in the temperature until reaching a transition temperature which is a function of the material and increases suddenly above the transition temperature. The electric resistance of the resistance element 4 is determined by a voltmeter 7 which measures a voltage present on a resistance element 4. When the transition temperature of the resistance element 4 is exceeded, the voltage measured by the voltmeter 7 increases suddenly. Since the liquid 2 cools the resistance element 4 substantially more than air which is present over the liquid 2, it can be determined in this way whether the resistance element 4 is covered with liquid 2.

Figure 2:
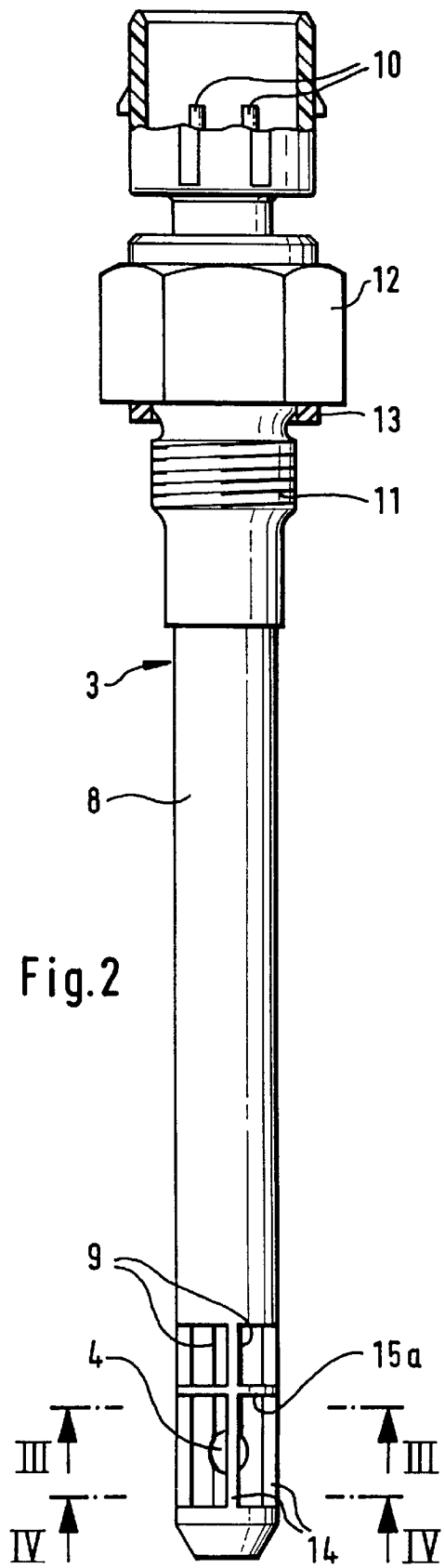
FIG. 2 shows the limit-level sensor of FIG. 1.

FIG. 2 shows the limit-level sensor 3 of FIG. 1 with the resistance element 4 arranged in the lower region of a housing 8. From the resistance element 4, connecting wires 9 lead to connecting contacts 10 protruding from the top of the housing 8. The housing 8 has a thread 11 and a hexagon 12, arranged above the tread 11 for attaching a wrench, not shown in the drawing. Furthermore, the housing 8 is provided on the bottom of the hexagon 12 with a packing ring 13 which is provided in order to seal-off the limit-level sensor 3 which is mounted in the container 1. In its lower region, the housing 8 has longitudinal bars 14 and transverse bars 15 which are at a distance from the resistance element 4. The resistance element 4 is thus held in a cage which is traversed by the liquid 2 shown in FIG. 1.

Figure 3:
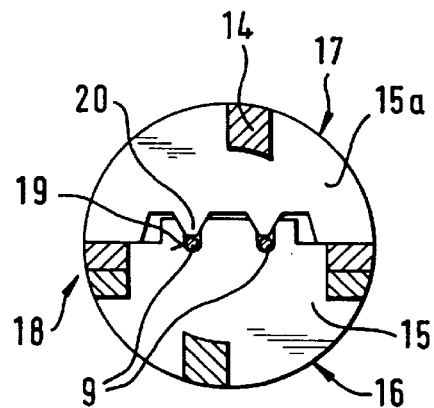
FIG. 3 is a sectional view through the limit-level sensor of FIG. 2 along the line III—III.

The construction of the housing 8 and the attachment of the connecting wires 9 of the limit-level sensor 3 is shown in FIG. 3. The housing 8 has two housing parts 16, 17 which are connected to each other by detents 18. Transverse bars 15, 15a are arranged on the housing parts 16, 17 respectively. The transverse bar 15 of the one housing part 16 has grooves 19 to receive the connecting wires 9, while the transverse bar 15a of the other housing part 17 has projections 20 which press the connecting wires 9 into the grooves 19. In this way, the connecting wires 9 of the resistance element 4 are clamped between the transverse bars 15, 15a arranged on the two housing parts 16, 17 of the housing 8.

Figure 4:
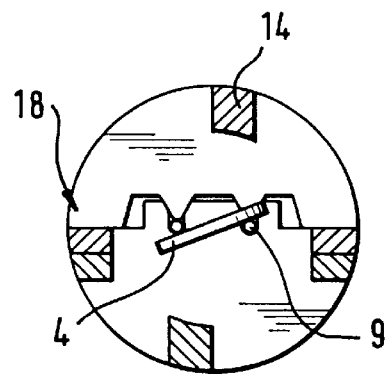
FIG. 4 is a cross-sectional showing through the limit-level sensor of FIG. 2, along the line IV—IV.

FIG. 4 shows, in a sectional view through the housing 8, that the resistance element 4 is of disk shape and is fastened exclusively to the connecting wires 9. In this way, the resistance element 4 is held fixed against oscillation and the liquid 2 flows around all of it.

What is claimed is:

1. A limit-level sensor for determining whether an intended level of liquid in a container is not reached or is exceeded, the sensor being suitable for use with automotive liquids, the sensor comprising:

a resistance element for receiving an electric current, the resistance element changing its electric resistance upon an increase in temperature;

a measurement unit for measuring the electric resistance;

a housing having a first housing part and a second housing part, said housing parts meeting to form a cage enclosing said resistance element;

a bar extending within an transversely of said housing;

connecting wires leading from the bar to the resistance element, a first of the connecting wires being disposed alongside a second of the connecting wires;

wherein the resistance element is to be located entirely within a liquid of an intended level, the connecting wires are clamped between the first and the second housing parts by means of said bar to hold said resistance element fixed against oscillation and spaced apart from elements of said cage, a spacing between elements of the cage and the resistance element inhibiting dissipation of heat of the resistance element via the elements of the cage, and wherein the electric resistance varies abruptly above a transition temperature of the resistance element, the transition temperature lying above a maximum temperature of the liquid.

2. A limit-level sensor according to claim 1, wherein the resistance element is a PTC element.

3. A limit-level sensor according to claim 1, further comprising a series resistor, wherein the resistance element is connected in series with the series resistor.

4. A limit-level sensor according to claim 1, wherein the resistance element is connected by solder or weld to the connecting wires, and the housing has only points of contact with the connection wires.

5. A limit-level sensor according to claim 1, wherein the resistance element is spaced apart from regions of the housing which are adjacent to the resistance element.

6. A limit-level sensor according to claim 1, wherein the connecting wires comprise constantan for inhibiting a discharge of heat of the resistance element over the connecting wires.

7. A limit-level sensor according to claim 1, wherein the resistance element is a first resistance element, the sensor further comprising a second resistance element located at a different liquid level from the first resistance element upon submersion of the sensor in a liquid.

8. A method for determining whether an intended level of liquid in a container is exceeded or not reached, the method comprising steps of:

locating a resistance element within an intended level of the liquid, wherein electrical resistance of the resistance element changes with increase in temperature upon a heating of the resistance element by an electric current;

enclosing the resistance element within a housing which extends in longitudinal direction into the liquid, a portion of said housing defining a cage which encloses said resistance element;

extending a bar transversely across the housing for fixing the resistance element against oscillation and spaced apart from elements of said cage, a spacing between element of the cage and the resistance element inhibiting dissipation of heat of the resistance element via the elements of the cage;

leading wires from the bar to he resistance element, a first of the wires being disposed alongside a second of the wires;

clamping the wires by means of the bar in a fixed position relative to the housing; and measuring the electric resistance by feeding as much electrical energy via the wires to the resistance element upon a heating of the resistance element as is necessary in order to exceed a transition temperature of the resistance element present in air for an abrupt change in the electrical resistance.

9. A method according to claim 8, further comprising a step of:

heating the resistance element by applying electric current to the resistance element via a series resistance; and wherein, in said measuring step, the voltage on the resistance element is measured.

10. A method according to claim 8, wherein the liquid is motor oil in an internal combustion engine of a motor vehicle, the method further comprising a step of commencing heating of the resistance element after a connecting of ignition and a few seconds before a starting of the internal combustion engine or in a period of about five to ten minutes after a shut down of the internal combustion engine.

11. A method according to claim 10, wherein the transition temperature is approximately 250° C.

12. A method for determining whether an intended level of liquid in a container is exceeded or not reached, the method comprising steps of:

locating a resistance element within the liquid at an intended level of the liquid, the resistance of the resistance element being characterized by a transition temperature, wherein electrical resistance of the resistance element changes with increase in temperature upon a heating of the resistance element by an electric current;

providing a housing for supporting the resistance element in the liquid, the housing terminating in a cage which encloses the resistance element;

spacing elements of the cage away from the resistance element to allow for flow of liquid between the resistance element and elements of the cage, a spacing between the elements of the cage and the resistance element via the elements of the cage;

extending a bar transversely across the housing for fixing the resistance element against oscillation and spaced apart from elements of said cage;

leading wires from the bar to the resistance element, a first of the wires being disposed alongside a second of the wires;

clamping the wires by means of the bar in fixed position relative to the housing;

heating the resistance element and liquid adhering to the resistance element by application of electric current to the resistance element, the heating reducing viscosity of the liquid to facilitate flow of the liquid past the resistance element; and measuring the electric resistance by feeding as much electrical energy to the resistance element upon a heating of the resistance element as is necessary in order to exceed a transition temperature of the resistance element present in air for an abrupt change in the electrical resistance.

13. A limit-level sensor for determining whether an intended level of liquid in a container is not reached or is exceeded, the sensor comprising:

a resistance element for receiving an electric current, the resistance element changing its electric resistance upon an increase in temperature;

a cage enclosing the resistance element, wherein elements of the cage are spaced apart from the resistance element for flow of the liquid past the resistance element, a spacing between the elements of the cage and the resistance element inhibiting dissipation of heat of the resistance element via the elements of the cage;

a bar extending across the cage;

connecting wires leading from the bar to the resistance element, a first of the connecting wires being disposed alongside a second of the connecting wires a measurement unit connected by the wires to the resistance element for measuring the electric resistance;

wherein the resistance element is to be located entirely within a liquid of an intended level, and the electric resistance varies abruptly above a transition temperature of the resistance element, the transition temperature lying above a maximum temperature of the liquid; and wherein a heating of the resistance element with electric current supplied by the connecting wires serves to heat liquid adhering to the resistance element for reducing viscosity of the liquid to facilitate flow of the liquid past the resistance element, and the connecting wires are clamped by means for the bar in a fixed position relative to the housing.

* * * * *